United States Patent
Tyrer

(10) Patent No.: US 9,637,062 B2
(45) Date of Patent: May 2, 2017

(54) APPARATUS FOR HOLDING AN ELECTRONIC DEVICE ON A GOLF CART

(71) Applicant: Stephen Tyrer, Deer Park, NY (US)

(72) Inventor: Stephen Tyrer, Deer Park, NY (US)

(73) Assignee: Stephen Tyrer, Deer Park, NY (US)

( * ) Notice: Subject to any disclaimer, the term of this patent is extended or adjusted under 35 U.S.C. 154(b) by 35 days.

(21) Appl. No.: 14/611,464

(22) Filed: Feb. 2, 2015

(65) Prior Publication Data

US 2015/0217701 A1 Aug. 6, 2015

Related U.S. Application Data

(60) Provisional application No. 61/934,353, filed on Jan. 31, 2014.

(51) Int. Cl.
*B60R 11/02* (2006.01)
*B60R 11/00* (2006.01)

(52) U.S. Cl.
CPC .......... *B60R 11/02* (2013.01); *B60R 11/0241* (2013.01); *B60R 11/0252* (2013.01); *B60R 2011/001* (2013.01); *B60R 2011/0045* (2013.01); *B60R 2011/0071* (2013.01); *B60R 2011/0075* (2013.01); *B60R 2011/0085* (2013.01)

(58) Field of Classification Search
CPC ....... B60R 2011/001; B60R 2011/0085; B60R 11/02
USPC .................................................. 224/274, 276
See application file for complete search history.

(56) References Cited

U.S. PATENT DOCUMENTS

| | | | | | |
|---|---|---|---|---|---|
| 4,166,559 A | * | 9/1979 | Richardson | ............ | B60N 3/005 108/44 |
| 4,453,788 A | * | 6/1984 | Russell | .................. | B60N 3/005 108/44 |
| 4,698,838 A | * | 10/1987 | Ishikawa | ............. | B60R 11/0241 224/276 |
| 4,850,015 A | * | 7/1989 | Martin | ................ | B60R 11/0241 224/276 |
| 5,072,628 A | * | 12/1991 | Oki | ........................ | B60K 35/00 74/484 R |
| 5,083,736 A | * | 1/1992 | McCoy | ................... | B43L 3/008 211/69.5 |
| D342,474 S | * | 12/1993 | Oki | .............................. | D12/176 |
| 5,385,283 A | * | 1/1995 | Shioda | ................... | B60N 3/005 224/276 |
| 5,542,314 A | * | 8/1996 | Sullivan | .............. | B60R 11/0252 211/119 |
| 6,305,217 B1 | * | 10/2001 | Mansfeld | ................. | G12B 9/08 224/276 |
| 6,321,912 B1 | * | 11/2001 | Lippert | .................... | A45C 5/14 206/320 |

(Continued)

FOREIGN PATENT DOCUMENTS

| | | | | |
|---|---|---|---|---|
| DE | 102007020929 A1 | * | 11/2008 | ......... B60R 11/0264 |
| DE | 102015007519 A1 | * | 12/2015 | ......... B60R 11/0235 |

*Primary Examiner* — Justin Larson

(74) *Attorney, Agent, or Firm* — Hoffmann & Baron, LLP

(57) ABSTRACT

A holder for an electronic device is mounted on a golf cart steering wheel. The holder preferably is rotatable relative to the golf cart steering wheel. The holder may include a weatherproof cover to protect the electronic device from the elements. The holder may also include a lock to releasably secure the electronic device within the holder.

10 Claims, 7 Drawing Sheets

(56) References Cited

U.S. PATENT DOCUMENTS

| | | | | |
|---|---|---|---|---|
| 6,983,170 B2* | 1/2006 | Stulberger | .......... | B60R 11/0241 379/354 |
| 7,474,204 B2* | 1/2009 | Songwe | ................ | B60K 35/00 296/37.12 |
| 8,955,728 B2* | 2/2015 | Schultze | .................. | B62J 9/008 224/413 |
| 9,090,282 B2* | 7/2015 | Salvini | .................... | B62D 1/065 |
| 9,193,375 B2* | 11/2015 | Schramm | ............... | B60K 35/00 |
| 2004/0182897 A1* | 9/2004 | Andrews | ................. | B60N 3/101 224/274 |
| 2006/0052167 A1* | 3/2006 | Boddicker | ............. | B60N 3/005 463/37 |
| 2007/0029359 A1* | 2/2007 | Smith | ...................... | B60R 11/02 224/276 |
| 2009/0108617 A1* | 4/2009 | Songwe | ................. | B60K 35/00 296/70 |
| 2009/0189373 A1* | 7/2009 | Schramm | ............... | B60K 35/00 280/731 |
| 2011/0024470 A1* | 2/2011 | Hajarian | ............. | B60R 11/0241 224/276 |
| 2012/0074674 A1* | 3/2012 | Ohoka | ................ | B60R 11/0235 280/728.3 |
| 2012/0080465 A1* | 4/2012 | Son | ......................... | B60R 11/02 224/276 |
| 2014/0001219 A1* | 1/2014 | Miller | ..................... | B60R 11/02 224/553 |
| 2015/0217701 A1* | 8/2015 | Tyrer | ...................... | B60R 11/02 224/276 |
| 2016/0001807 A1* | 1/2016 | Hans | ...................... | B62D 1/046 345/173 |

* cited by examiner

APPARATUS FOR HOLDING AN ELECTRONIC DEVICE ON A GOLF CART

This application claims priority to U.S. Provisional Application Ser. No. 61/934,353 filed on Jan. 31, 2014, the disclosure of which is incorporated herein by reference in its entirety.

FIELD OF THE INVENTION

The present invention relates to a an apparatus for holding an electronic device on a golf cart. Preferably, the apparatus is provided on the golf cart steering wheel assembly. The apparatus is adapted to hold a smartphone and/or a computer tablet.

BACKGROUND

Many golfers carry smartphones or computer tablets when playing a round of golf. The smartphones or tablets may include application software to assist the golfer to keep score or to provide the golfer with information about the course being played. However, there is no convenient location on a golf cart to securely hold such electronic devices. Golf carts include open compartments in which the electronic devices can slide around and break. Otherwise, golfers may store their devices in their golf bags which is inconvenient if being used to keep score.

Furthermore, some golf courses are using tablets or similar electronic devices with touch screens mounted to the cart to provide information regarding the carts, cart paths, and golfer's scores. One such system is offered under the tradename Visage™ Mobile Golf Information System. The electronic device associated with the Visage system is mounted to the underside of the roof and hangs down therefrom in the passenger compartment adjacent to the top of the windshield frame. This mounting location takes away from the golfer's view of the course while driving the cart and can be a distraction.

Thus, there exists a need for a convenient place to mount a smartphone or tablet within the golf cart passenger compartment.

SUMMARY

An apparatus for holding an electronic device in a golf cart having a steering wheel, the apparatus including means for releasably holding an electronic device, and wherein the holding means is mounted to the golf cart steering wheel. Preferably, the holding means is adapted to rotate relative to the steering wheel. In one embodiment, the holding means comprises a bracket.

As noted above, the bracket is rotatable related to the steering wheel so that the user can position the device for use regardless of the position of the steering wheel. In a further embodiment, the holding means comprises a removably mountable case on the steering wheel. In each embodiment, it is preferable that the holding means provide a weatherproof enclosure for the electronic device. The case may also include a means for locking the electronic device into the case. The locking means is preferably a key lock to secure the electronic device from theft. The electronic device may be a smartphone or computer tablet.

In yet a further embodiment, the holding means is a replacement steering wheel having a means for removably receiving an electronic device, such that the receiving means is rotatable relative to the steering wheel. Preferably, the receiving means includes a weatherproof cover to protect the electronic device.

Other features and advantages of the present invention will become apparent from the following more detailed description, taken in conjunction with the accompanying drawings, which illustrate, by way of example the principles of the invention.

DETAILED DESCRIPTION

Many golfers desire to use their smartphones and/or computer tablets during a round of golf to enter scores or access software applications which enhance the golfing experience. Likewise, some golf courses are now turning to golf cart management systems which use a computer or tablet mounted to the golf cart to monitor use and provide information to the golfers. However, with respect to personal smartphones and/or tablets, there is no secure and convenient place to put the electronic device within the golf cart. Similarly, currently mounted golf management system devices are secured to the windshield frame below the roof within the passenger compartment. Such mounting is inconvenient, partially blocks the view from the passenger compartment and is aesthetically unpleasant when looking at the golf cart.

The present invention solves this problem by providing either a mounting bracket or case which is attachable to the golf cart steering wheel or providing a replacement golf cart steering wheel including a means for securely mounting an electronic device such as a tablet device. The golf cart steering wheel is a convenient place for mounting an electronic device for viewing and using during a round of golf.

Golfers are already accustomed to placing a scorecard under a clip mounted on the steering wheel. Accordingly, mounting an electronic device, such as a tablet or smartphone to the golf cart steering wheel will be readily accepted by the golfer and does not obstruct the view from the passenger compartment.

Figure 1:
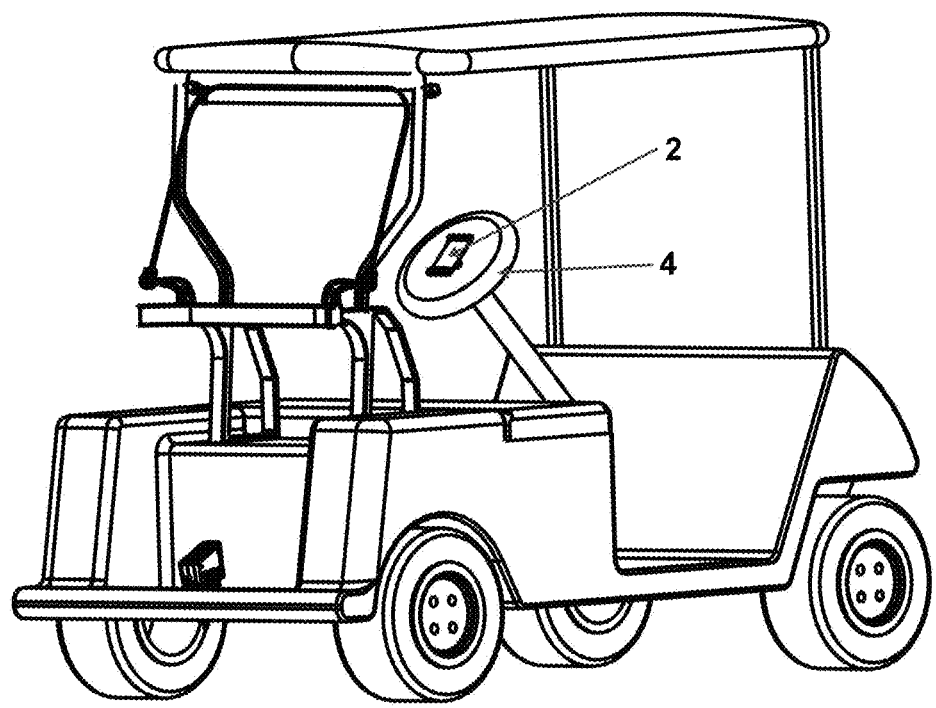
FIG. 1 is a perspective view of a golf cart illustrating a steering wheel having a mounting bracket for holding an electronic device, the mounting bracket being formed in accordance with the present invention.
Figure 2:
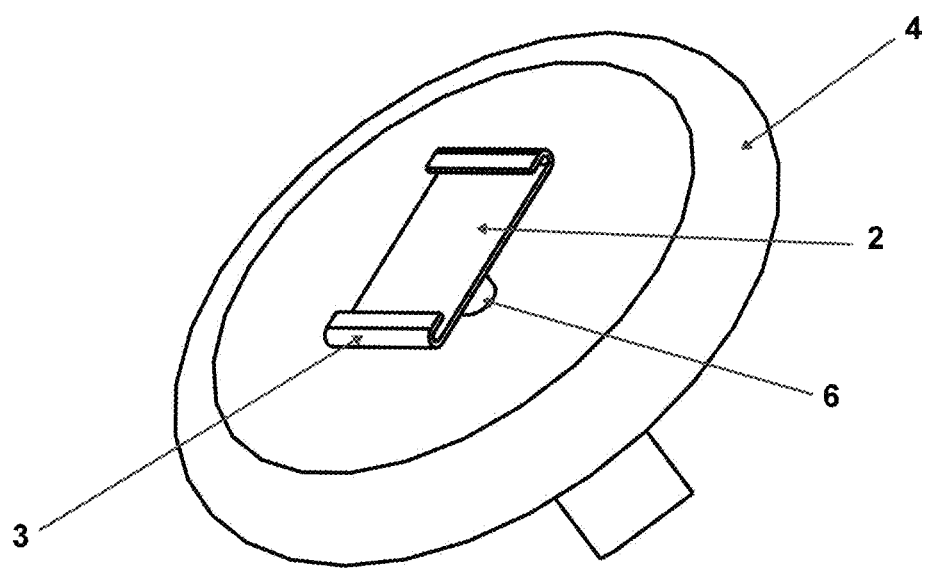
FIG. 2 is an enlarged view of the golf cart steering wheel and mounting bracket shown in FIG. 1.

FIG. 1 illustrates a golf cart having an electronic device holder 2 mounted on a golf cart steering wheel. FIG. 2 is a detailed view of the steering wheel 4 shown in FIG. 1. Preferably the electronic device holder 2 is provided on the steering wheel 4 where the score card is typically held. It is envisioned that the electronic device would be capable of keeping score and providing information regarding the golf course such as distances, par, and other information usually provided on the score card. Additionally, the electronic device, such as a smartphone or computer tablet, may have application software (an "app") or access to wifi provided by the golf course to obtain the course information. The electronic device would therefore replace scorecards, pencils, gps systems, etc.

To make the electronic device easy to use and access, the present invention provides a holder 2 which is attached to the steering wheel 4. As shown in FIG. 2, the holder 2 may comprise a bracket member 3 which is rotatably mounted on a post 6 secured to the steering wheel 4. Thus, the bracket 3 would be rotatable relative to the steering wheel so that the electronic device may be properly positioned to be viewed regardless of the position of the steering wheel. Alternatively, the bracket 3 may be fixedly secured to the post 6, wherein the post is rotatable relative to the steering wheel 4. The bracket 3 may be dimensioned to receive a phone or tablet device. In this embodiment, the holder 2 is a separate unit attachable to the steering wheel.

In a second embodiment shown in FIGS. 3-6, the holder and steering wheel are provided as a unit which can replace a standard golf cart steering wheel. In the case of a complete steering wheel unit, the steering wheel may be made larger to accommodate large tablets such as an iPad.

Figure 3:
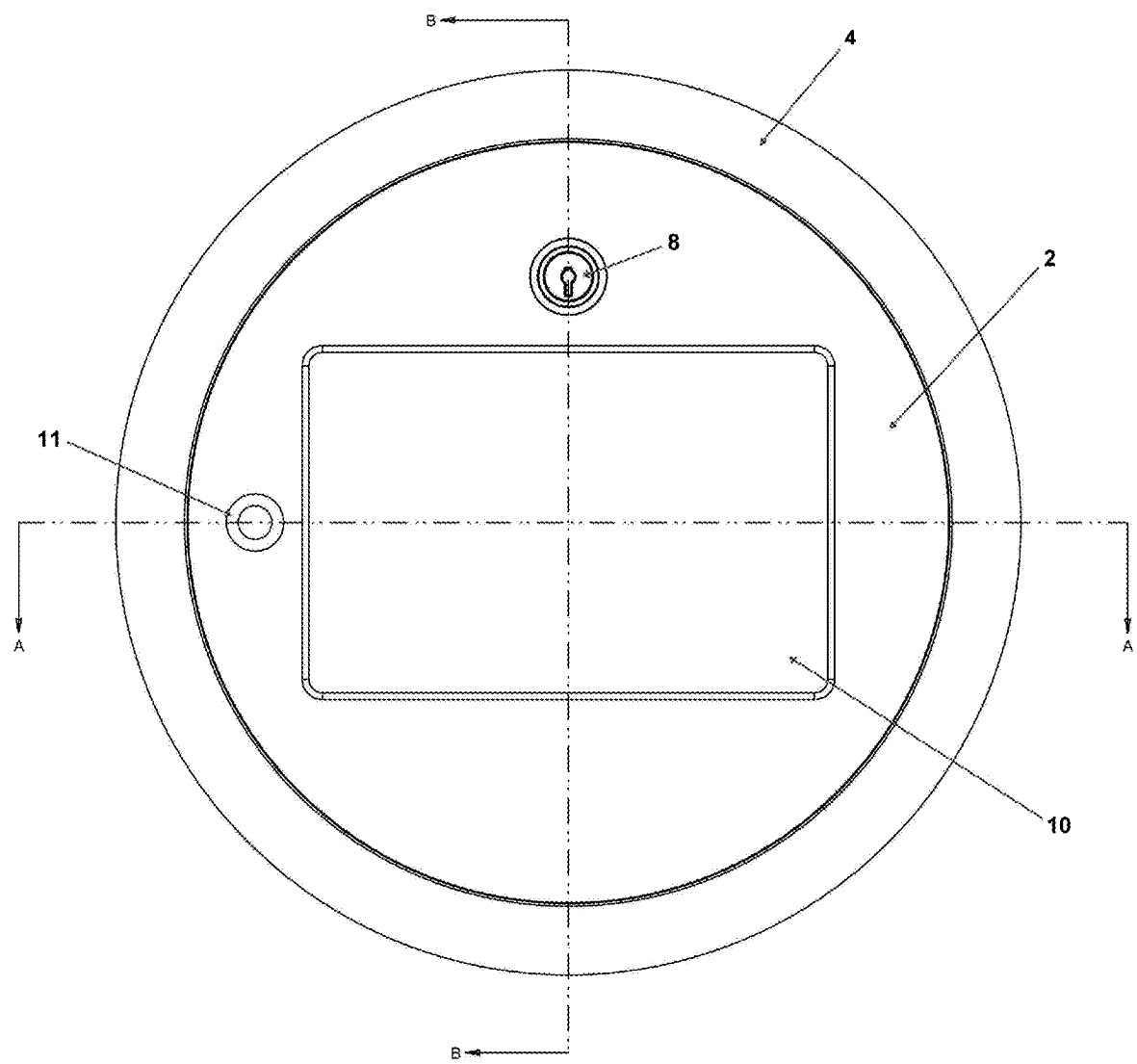
FIG. 3 is a top view of a golf cart steering wheel illustrating a second embodiment of the apparatus for holding an electronic device on a golf cart, wherein the original golf cart steering wheel is replaced with a steering wheel incorporating the apparatus of the present invention.
Figure 4:
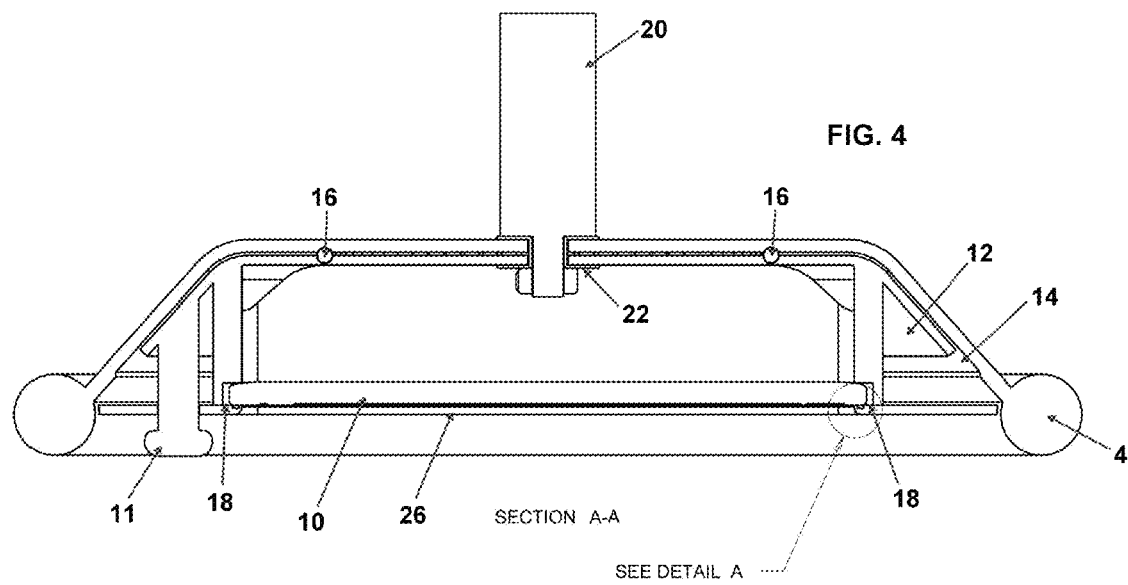
FIG. 4 is a cross-section taken through line A-A of FIG. 3.
Figure 5:
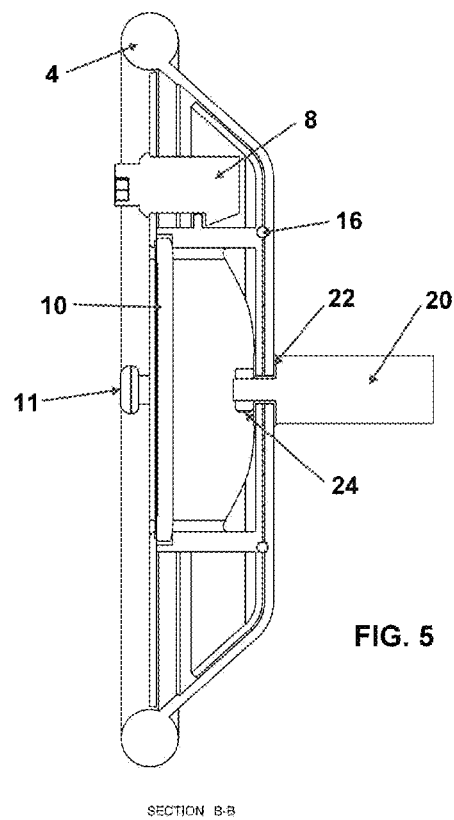
FIG. 5 is a cross-section taken through line B-B of FIG. 3.

As shown in FIGS. 3-5, the steering wheel 4 includes a holder 2 adapted to receive for example, a tablet device 10 such as an iPad or iPad mini. The steering wheel 4 also includes a lock 8 to secure the electronic device to the holder on the steering wheel. As shown in FIGS. 3 and 4, the rotatable electronic device holder may further include a knob 11 which extends upward from a surface of the steering wheel. The knob 11 provides a means for rotating the holder relative to the outer portion of the steering wheel 4 to allow the electronic device to be positioned for use regardless of the position of the steering wheel.

With reference to FIGS. 4 and 5 which are cross-sections of FIG. 3, the holder 2 includes an outer housing 12 including an outer wall shaped to conform to the inner wall of the steering wheel 14. In this embodiment, a plurality of ball bearings 16 are provided in a circular-shaped groove between the inner wall of the steering wheel and the outer housing of the holder, similar to the ball bearing system used on caster wheels found on shopping carts. Thus, the holder 12 is freely rotatable 360° in either direction in relation to the outer steering wheel 4. For example, if the steering wheel is turned fully to one side, the holder may be rotated using the knob 11 to place the electronic device in the proper position for use by the golf cart operator.

As shown in FIGS. 4 and 5, the electronic device holder includes an aperture 18 to receive and hold the electronic device 10. The rotatable outer housing of the holder is adapted to rotate the electronic device holder relative to the outer steering wheel 4 via the ball bearing system. Alternatively, the steering wheel may include a recess adapted to receive an outwardly extending flange member on the holder outer housing to permit rotation of the holder body relative to the steering wheel. Other means for providing rotation of the holder relative to the steering wheel are contemplated by the invention and will be apparent to those of ordinary skill in the art.

As shown in FIGS. 4 and 5, the replacement steering wheel is easily mounted on the steering shaft 20. The steering wheel includes a tubular rivet 22 which fits over the steering shaft 20. A steering shaft nut 24 can then be tightened to affix the steering wheel to the shaft.

As shown in FIG. 5, to prevent theft, the holder for the electronic device preferably includes a locking means. As shown in FIGS. 3-5, a standard locking cylinder with a key may be used to lock the electronic device 10 below a weatherproof and preferably water-tight screen cover of the holder. When the lock is unlocked, the screen cover may be lifted or hingedly rotated so that the tablet may be removed from the holder. The type of lock used to keep the tablet secured with the holder is not important as long as it removably secures the electronic device with the holder. Thus, those skilled in the art will appreciate that other locking mechanisms may be adapted without departing from the scope and spirit of the invention.

As noted above, since golf can be played in rainy or damp weather, it is an object of the invention to provide a weatherproof barrier for the electronic device mounted on the steering wheel. With respect to the bracket embodiment shown in FIGS. 1 and 2, it is envisioned that the electronic device will be enclosed within a weatherproof cover, such as those offered for sale under the tradename OtterBox™. The device enclosed in the weatherproof cover may be mounted on the steering wheel bracket for use by the golfer.

Figure 6:
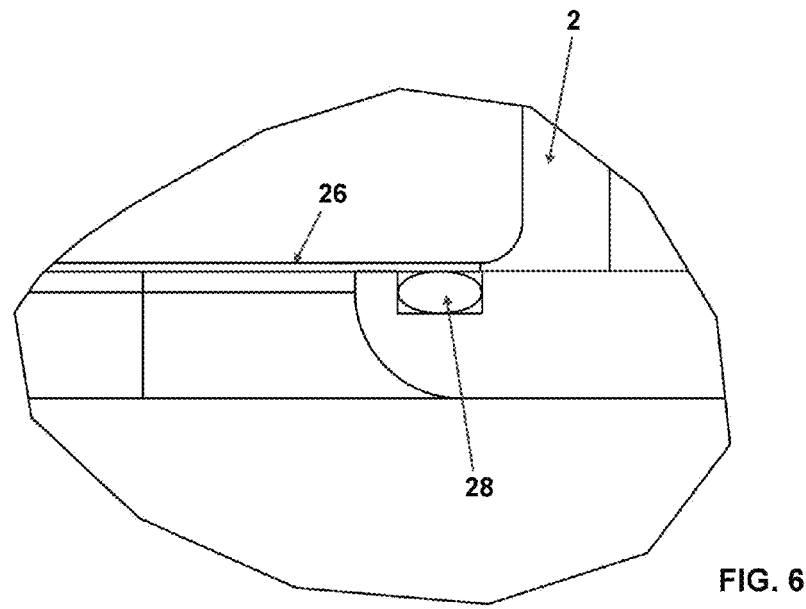
FIG. 6 is a detailed view of the seal ring gasket for the weatherproof screen cover shown in FIG. 4.

In the replacement wheel embodiment, as shown in greater detail in FIG. 6, the holder includes a weatherproof screen cover 26. The weatherproof seal is accomplished via a sealing ring 18. The sealing ring may be, for example, an o-ring gasket which provides a seal between the holder 2 and the screen cover 26. The screen cover 26 completely covers the aperture for holding the electronic device. Preferably, the screen cover 26 is sufficiently thick to protect the device, yet permits the user to access and utilize the touch screen for the electronic device. The screen cover 26 is designed to be easily replaceable should it become scratched or worn. Accordingly, the replacement steering wheel with the electronic device holder as illustrated in FIGS. 3-6 is weatherproof, rotatable with respect to the outer steering wheel, able to be locked to secure the device with the holder and permits the device to be removed from the holder at the end of the round of golf, if desired.

Figure 7:
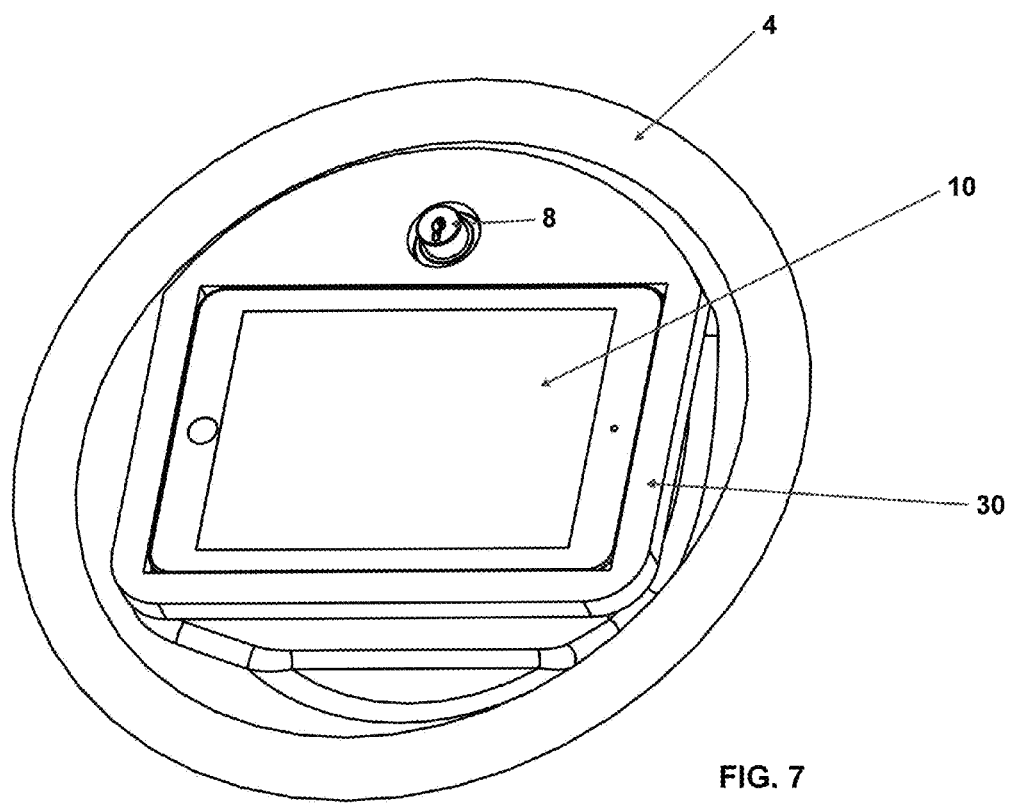
FIG. 7 is a perspective view of a third embodiment of the apparatus for holding an electronic device on a golf cart, the golf cart steering wheel including a removable case for holding the electronic device.
Figure 8:
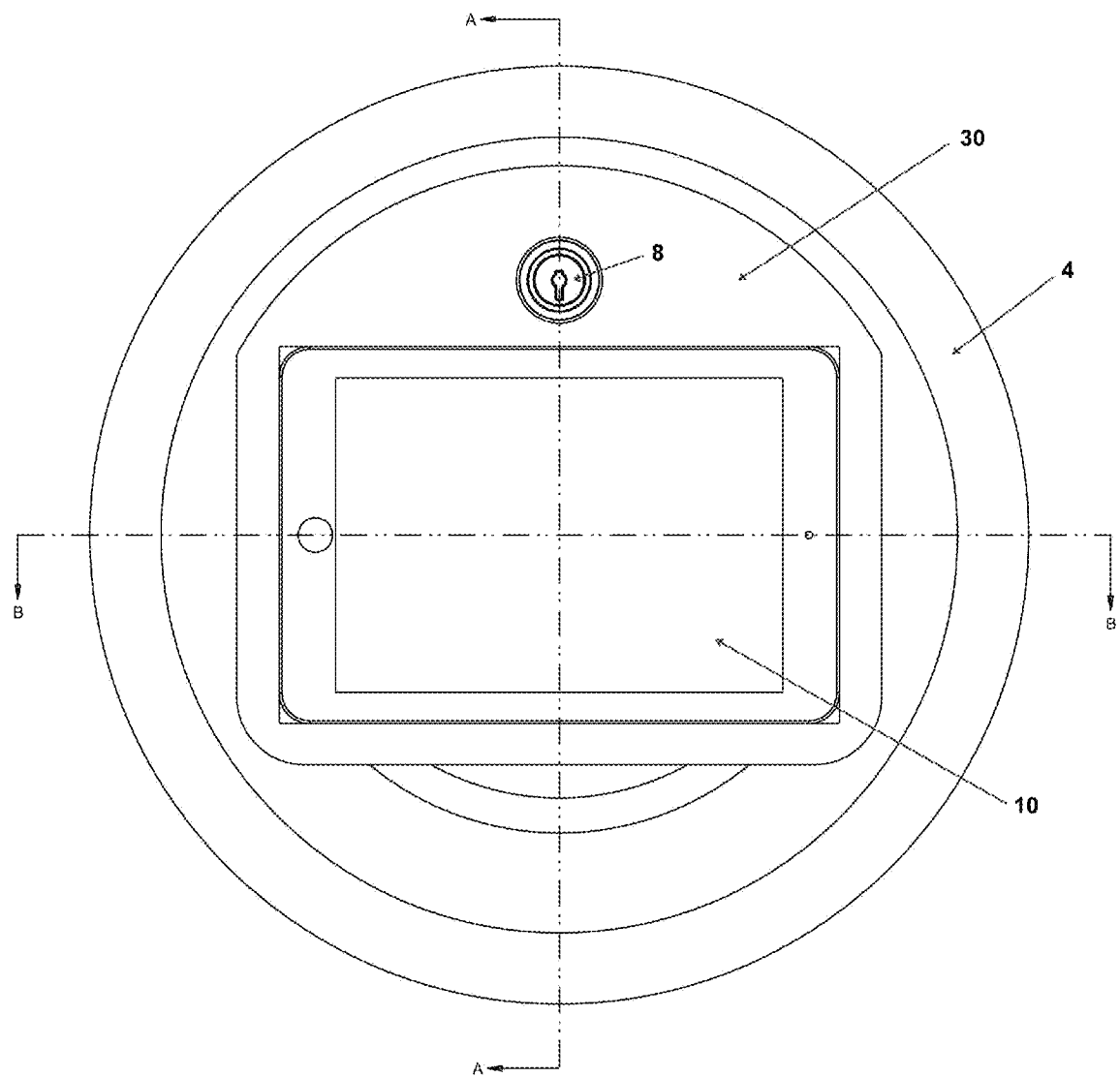
FIG. 8 is a top view of the golf cart steering wheel and removable case shown in FIG. 7.
Figure 9:
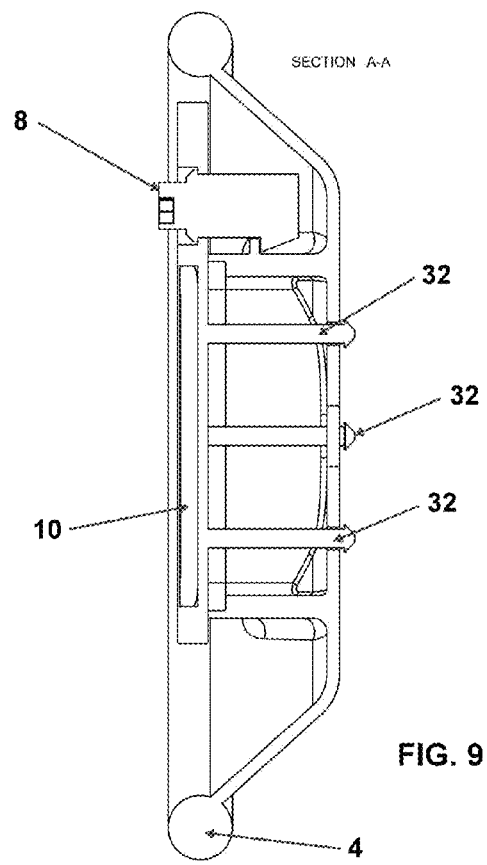
FIG. 9 is a cross-sectional view taken through line A-A of FIG. 8.
Figure 10:
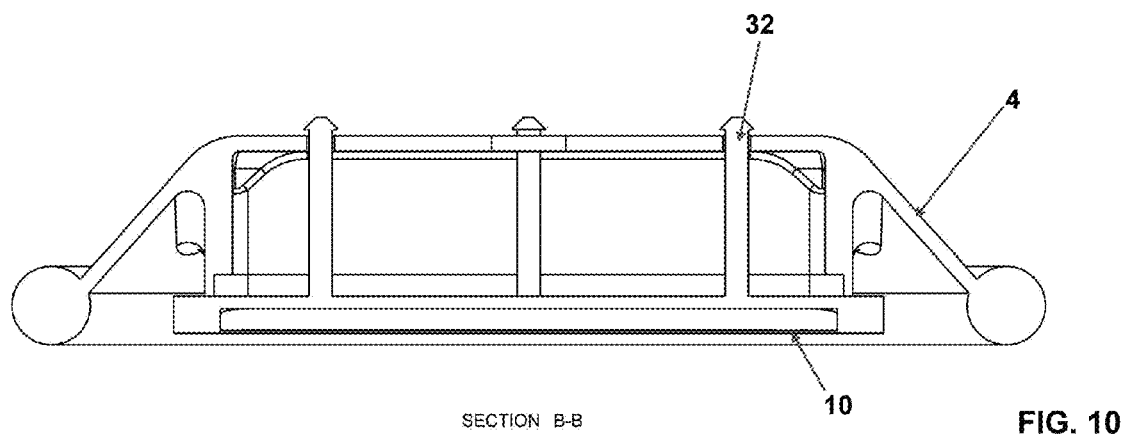
FIG. 10 is a cross-sectional view taken through line B-B of FIG. 8.
Figure 11:
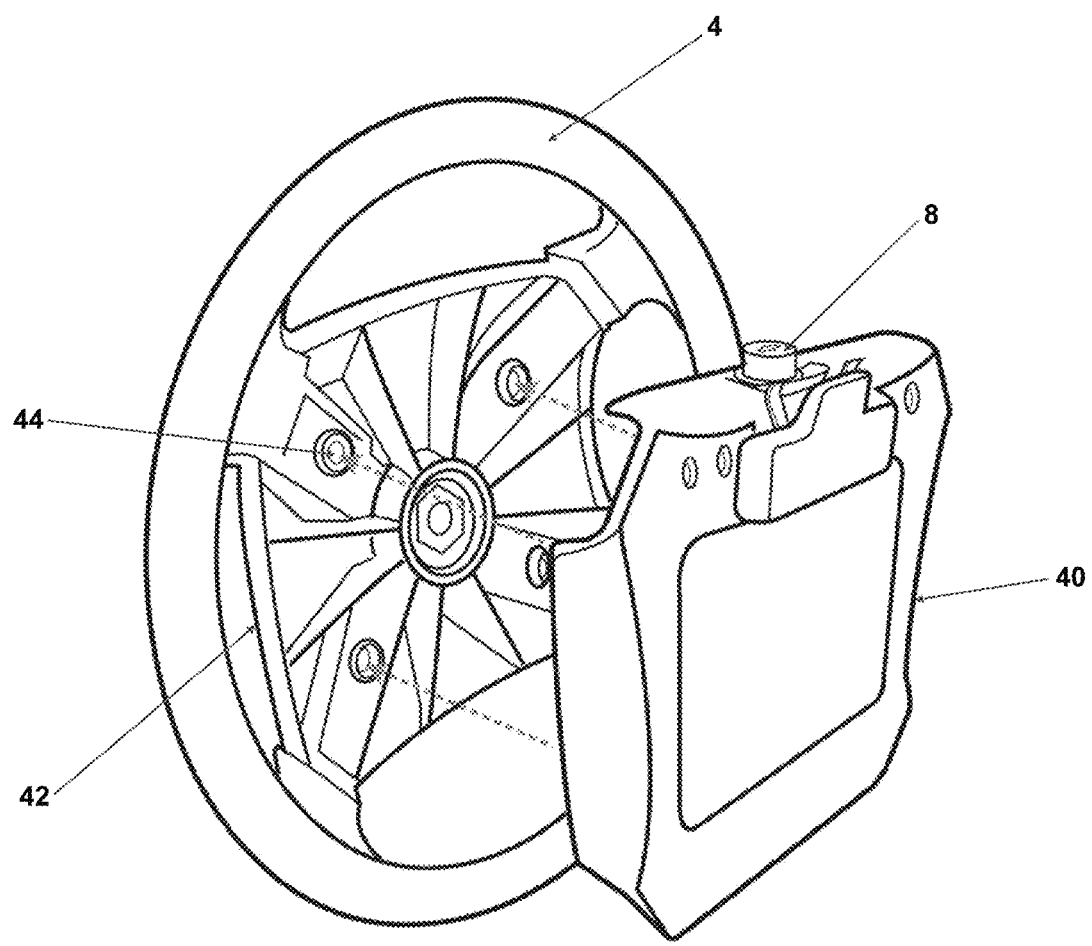
FIG. 11 is a fourth embodiment of the apparatus for holding an electronic device on a golf cart steering wheel wherein a case is provided which is attachable to the golf cart steering wheel.

FIGS. 7-10 illustrate a third embodiment of the electronic device holder of the present invention. In this embodiment, a case 30 for holding the electronic device is removably mounted to a standard golf cart steering wheel with the front cover removed from the steering wheel. Similar to the embodiment illustrated in FIGS. 3-6, the case may include a weatherproof cover and a locking means 8 to secure the case 30 to the steering wheel. The locking means 8 is shown as a simple cylinder lock with a key to lock the device in the case. As shown in FIGS. 9 and 10, the case 30 may include a plurality of mounting posts 32 which align with holes in a standard steering wheel for a golf cart once the steering wheel center cover is removed.

The case 30 as shown in FIGS. 7-10 does not rotate with respect to the steering wheel, although a similar ball bearing arrangement may be employed to provide such rotation if desired. FIG. 7 is a perspective view of the case 30 including a tablet 10 mounted therein and the case attached to the steering wheel. FIG. 8 is a top view of the case 30 mounted in the steering wheel 4 as shown in FIG. 7. FIG. 9 is a cross-sectional view through line A-A of FIG. 7 illustrating the locking mechanism 8 and the mounting posts 32 extending through apertures in the steering wheel housing. FIG. 10 is a cross-section through line B-B of FIG. 7 illustrating the tablet mounted in the case 30 which is secured to the steering wheel 4.

Similar to FIGS. 7-10, FIG. 11 illustrates the electronic device holder in the form of a separate case 40 mountable to a standard golf cart steering wheel 4. The case 40 is removably mounted to the steering wheel 4 so that the golfer of golf course personnel can install the case upon being provided the cart and remove the case when the cart is returned at the end of the round of golf. The golf cart steering wheel includes a base 42 upon which the case can be mounted. For example, the case may include latching fingers or posts which are adapted to be received in openings 44 in the steering wheel base. The case 40 also includes a means for mounting the electronic device within the case such as a locking, pivoting door. In a preferred embodiment, the case 40 includes a key lock 8 so that the electronic device may be securely locked into the case. The case is preferably weatherproof, through the use of gaskets to seal the pivoting door against the case body. The case is also preferably made from a shock resistant polymer plastic or rubber.

Other features of the present invention include providing a USB charger on the golf cart for charging the electronic devices. The USB charger may be part of the steering wheel assembly or may be mounted nearby for easy access. Furthermore, the holder may include a casing surrounding the electronic device. The casing would preferably be weatherproof and break-resistant. For example, the case may include a break-resistant transparent cover made from, e.g., Kevlar. Also, the holder may include a shade shield which may be moved to shade the screen from sunlight. Alternatively, the cover may include a tint so that the screen is visible even in bright sunlight.

Although illustrative embodiments of the present invention have been described herein with reference to the accompanying drawings, it is to be understood that the invention is not limited to those precise embodiments, and that various other changes and modifications may be applied therein by one skilled in the art without departing from the scope or spirit of the invention.

What is claimed is:

1. An aftermarket steering wheel assembly for a golf cart comprising:

a steering wheel including an outer housing having a sidewall, and a bottom wall parallel to and recessed with respect to a horizontal plane of the steering wheel;

an electronic device holder having a sidewall and a bottom wall, the bottom wall being positioned adjacent to the bottom wall of outer housing of the steering wheel;

means for freely rotating the holder relative the steering wheel outer housing, wherein the holder includes an aperture adapted to receive an electronic device and a screen cover which sealingly engages the holder to provide a waterproof seal; and wherein the outer housing bottom wall and holder bottom wall each include an aligned central opening therein adapted to receive a steering shaft for attaching the aftermarket steering wheel assembly to a golf cart.

2. The steering wheel assembly of claim 1, further comprising a tubular rivet extending through and mounted in the aligned central openings, the tubular rivet rotatably mounting the holder to the steering wheel outer housing and being adapted to receive a steering shaft of a golf cart.

3. The steering wheel assembly of claim 1, wherein the means for freely rotating the holder relative to the steering wheel outer housing comprises cooperating circumferential grooves in the holder and outer housing including a plurality of ball bearings provided therebetween.

4. The steering wheel assembly of claim 3, wherein the holder is rotatable 360° with respect to the steering wheel outer housing.

5. The steering wheel assembly of claim 1, wherein the aperture in the holder includes an elastomeric seal therearound to sealing engage the screen cover.

6. The steering wheel assembly of claim 5, wherein the elastomeric seal is an o-ring.

7. The steering wheel assembly of claim 1, wherein the holder includes a means for locking an elastomeric device into the holder.

8. The steering wheel assembly of claim 7, wherein the locking means comprises a standard locking cylinder with a key.

9. The steering wheel assembly of claim 1, wherein the electronic device holder is adapted to receive a computer tablet.

10. The steering wheel assembly of claim 1, wherein the sidewall and bottom wall of the holder is shaped to conform to the sidewall and bottom wall of the outer housing of the steering wheel.

* * * * *